US008022872B2

(12) United States Patent
Katayama et al.

(10) Patent No.: US 8,022,872 B2
(45) Date of Patent: Sep. 20, 2011

(54) POSITIONING RECEIVER

(75) Inventors: Hiroshi Katayama, Yokohama (JP); Akifumi Miyano, Yokohama (JP); Hirofumi Yoshida, Yokohama (JP); Kei Murayama, Sendai (JP); Kazuhiro Nojima, Yokohama (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 12/530,178

(22) PCT Filed: Mar. 7, 2007

(86) PCT No.: PCT/JP2007/054444
§ 371 (c)(1),
(2), (4) Date: Sep. 4, 2009

(87) PCT Pub. No.: WO2008/107982
PCT Pub. Date: Sep. 12, 2008

(65) Prior Publication Data
US 2010/0085251 A1    Apr. 8, 2010

(51) Int. Cl.
G01S 19/37    (2010.01)
G01S 19/33    (2010.01)
G01S 19/34    (2010.01)
(52) U.S. Cl. .......... 342/357.77; 342/357.72; 342/357.73
(58) Field of Classification Search ............ 342/357.01, 342/357.72, 357.73, 357.77; G01S 19/33
See application file for complete search history.

(56) References Cited

U.S. PATENT DOCUMENTS

| | | | |
|---|---|---|---|
| 6,038,248 A | 3/2000 | Rabaeijs | |
| 6,081,691 A * | 6/2000 | Renard et al. | 455/12.1 |
| 6,882,834 B1 * | 4/2005 | Balboni | 455/255 |
| 7,321,754 B2 * | 1/2008 | Zellweger et al. | 455/307 |
| 7,446,704 B2 * | 11/2008 | Kiukkonen | 342/357.68 |
| 7,764,226 B1 * | 7/2010 | Veitsel et al. | 342/357.73 |
| 2002/0039381 A1 | 4/2002 | Dooley | |
| 2004/0248537 A1 * | 12/2004 | Zellweger et al. | 455/260 |
| 2005/0162307 A1 | 7/2005 | Kato | |

(Continued)

FOREIGN PATENT DOCUMENTS
CN    201444633    *    7/2009
(Continued)

OTHER PUBLICATIONS

Kugelstadt, Thomas "Op Amps for Everyone, Chapter 16 Active Filter Design Techniques", @2002.*

(Continued)

Primary Examiner — Thomas Tarcza
Assistant Examiner — Frank McGue
(74) Attorney, Agent, or Firm — Seed IP Law Group PLLC

(57) ABSTRACT

A positioning receiver in which the circuit configuration of the receiving system corresponding to a plurality of positioning systems can be simplified and the current consumption and circuit size of which can be reduced. A positioning receiver (100) comprises first low-pass filters (111, 121) which limit outputs of a first signal mixer (103) and a second signal mixer (104) to a first bandwidth, and second low-pass filters (112, 122) which are provided on the output side of the first low-pass filters (111, 121) and limit the outputs of the first low-pass filters (111, 121) to a second bandwidth narrower than the first bandwidth and sets the filter bandwidth of the first low-pass filters (111, 121) greater than that of the second low-pass filters (112, 122).

18 Claims, 11 Drawing Sheets

U.S. PATENT DOCUMENTS

| | | | |
|---|---|---|---|
| 2006/0234667 A1* | 10/2006 | Wang | 455/333 |
| 2010/0302100 A1* | 12/2010 | Yang et al. | 342/357.73 |
| 2011/0006947 A1* | 1/2011 | Pon et al. | 342/357.69 |
| 2011/0025559 A1* | 2/2011 | Chansarkar et al. | 342/357.73 |

FOREIGN PATENT DOCUMENTS

| | | | |
|---|---|---|---|
| JP | 02-147877 A | | 6/1990 |
| JP | 10-290212 A | | 10/1998 |
| JP | 11-513796 A | | 11/1999 |
| JP | 2000/266836 A | * | 9/2000 |
| JP | 2000-266836 A | | 9/2000 |
| JP | 2002-232314 A | | 8/2002 |
| JP | 2002/232314 A | * | 8/2002 |
| JP | 2003-329761 A | | 11/2003 |
| JP | 2004-513354 A | | 4/2004 |
| JP | 2004/513354 A | * | 4/2004 |
| JP | 2004-266361 A | | 9/2004 |
| JP | 2005-012600 A | | 1/2005 |
| JP | 2005/012600 A | * | 1/2005 |
| JP | 2005-207888 A | | 8/2005 |
| JP | 2005/207888 A | * | 8/2005 |
| WO | 97/14977 A1 | | 4/1997 |
| WO | 02/37710 A1 | | 5/2002 |

OTHER PUBLICATIONS

International Search Report dated Jun. 5, 2007, issued in corresponding International Application No. PCT/JP2007/054444, filed Mar. 7, 2007.

Lück, T., et al., "Trade-Off Between Pure Software Based and FPGA Based Base Band Processing for a Real Time Kinematics GNSS Receiver," ION GNSS 18th International Technical Meeting of the Satellite Division, Long Beach, California, Sep. 13-16, 2005, pp. 1589-1597.

Otaegui, O., et al., "A Hybrid Architecture for High Sensitivity Standalone and Assisted Galileo/GPS Receivers," ION GNSS 19th International Technical Meeting of the Satellite Division, Fort Worth, Texas, Sep. 26-29, 2006, pp. 2361-2369.

* cited by examiner

POSITIONING RECEIVER

TECHNICAL FIELD

The present invention relates to a positioning receiving apparatus that utilizes a GNSS (Global Navigation Satellite System) satellite.

BACKGROUND ART

A satellite positioning system receives information sent from a plurality of satellites going around the earth's orbit, measures the distance between the satellite positioning system and each satellite and calculates the current location of a receiving side apparatus. GPS, established by the United States Department of Defense, is a typical satellite positioning system, and provides a plurality of satellites referred to as "GPS satellites."

A GPS satellite performs spectrum spreading processing using predetermined PRN (Pseudo Random Noise) codes with respect to signals to be sent out. That is, a mobile communication terminal can acquire original signals by performing despreading processing of the signals sent out from these GPS satellites (hereinafter referred to as "GPS signals") using the matching PRN codes. Then, information about the current location of this mobile communication terminal and the current time can be acquired by carrying out processing such as message synchronization, ephemeris collection and PVT (Position, Velocity, Time) calculation.

Generally, a positioning apparatus that utilizes satellites receives four or more satellite signals at the same time, tracks the spreading codes by capturing the carrier waves and performs spectrum despreading processing to demodulate navigation data from the satellite signals. Further, by calculating the time a satellite transmitted a signal based on navigation data and finding a pseudo distance on a per satellite basis (i.e. the time a satellite signal took to reach the positioning apparatus), the positioning apparatus's location is determined based on the pseudo distance.

Currently, GPS receivers are widely utilized in various fields, such as car navigation systems, mobile telephones, airplane control and measurement of diastrophism. Although a GPS receiver receives the 1575.42 MHz signal referred to as "L1," the 1227.6 MHz signal and 1176.45 MHz signal will additionally become available as the second civilian signal (L2C) and third civilian signal (L5C), respectively.

Further, the Galileo system is planed in Europe to construct a satellite positioning system using the same number of satellites as in GPS. A plurality of frequency signals are also prepared for this Galileo system, and, consequently, by utilizing a plurality of these signals, it is possible to realize better performance than conventional performance (making a range of a receiving area wider and improving the accuracy of a positioning system).

Patent Document 1 discloses a positioning satellite receiving apparatus that has a plurality of receiving systems, and that switches receiving characteristics to set in a positioning receiving configuration with a plurality of receiving bands.

FIG. 1 is a functional block diagram showing a conventional positioning receiving apparatus having a plurality of receiving bands.

In FIG. 1, a high frequency signal received at receiving antenna 11 is amplified in received signal amplifier 12 formed with an LNA (Low Noise Amplifier), and then is inputted to I-ch (I-channel) mixer 13 and Q-ch (Q-channel) mixer 14 constituting a quadrature mixer.

90 degree phase shifter 15 supplies a local signal as is to mixer 13, from local oscillator 16 that performs oscillation at the same frequency as the carrier frequency, and shifts the local signal from local oscillator 16 90 degrees and supplies the local signal to mixer 14. As a result, mixer 13 converts the output signal of received signal amplifier 12 into a frequency-domain I signal, which is the baseband signal of the in-phase component, and outputs the frequency-domain I signal, and converts the output signal of received signal amplifier 12 into a frequency-domain Q signal, which is the baseband signal of the quadrature component, and outputs the frequency-domain Q signal.

These I signal and Q signal are subjected to processing for removing low frequency components through first I low pass filter 17 and first Q low pass filter 19, which are the first I and Q baseband filters, and received as input in digital processing section 21 through A/D converters (not shown), and are subjected to processing for removing low frequency components through second I low pass filter 18 and second Q low pass filter 20, which are the second I and Q baseband filters, and received as input in digital processing section 21 through A/D converts (not shown).

Digital processing section 21 performs digital signal processing of the first I and Q signals and second I and Q signals formed with digital signals, to extract data. The extracted data is outputted to CPU 22. CPU 22 is a controlling section that selects satellites to scan, performs tracking control of received signals and acquires navigation messages transmitted from satellites.

Patent Document 1 discloses a positioning satellite receiving apparatus that has a plurality of receiving systems, and switches receiving characteristics to set in a positioning receiving configuration having a plurality of receiving bands.

FIG. 2 is a block diagram showing a schematic configuration of the satellite positioning signal receiving apparatus having two receiving processing systems disclosed in Patent Document 1.

In FIG. 2, satellite positioning signal receiving apparatus 30 is constituted by: antenna 31 that receives signals from satellites; RF amplifying section 32 that amplifies the signals received at antenna 31; reference crystal oscillator 33; digital processing section 34 that performs signal processing; operation receiving section 35 that receives operations from the user; and two receiving processing systems, that is, the first receiving processing system formed with mixer section 41, local oscillator 42, IF amplifying section 43 and IF filter section 44, and the second receiving processing system formed with mixer section 51, local oscillator 52, IF amplifying section 53 and IF filter section 54.

Digital processing section 34 is constituted by microcomputers and the like, and executes various control processings for data demodulation. This digital processing section 34 is connected to local oscillators 42 and 52 and IF filter sections 44 and 54, and switches characteristics of these components to set separately. Local oscillators 42 and 52 are connected to one reference crystal oscillator 33, and generate frequencies based on commands from digital processing section 34 using the reference frequency acquired from reference crystal oscillator 33.

According to the above configuration, for example, a satellite positioning signal, which is the target to receive, is selected based on an operation received in operation receiving section 35 from the user or based on the received states of satellite positioning signals from digital processing section 34, and the characteristics of local oscillators 42 and 52 and IF filter sections 44 and 54 are switched to set.

Patent Document 1: Japanese Patent Application Laid-Open No. 2005-207888

DISCLOSURE OF INVENTION

Problems to be Solved by the Invention

However, such a conventional positioning receiving apparatus has the following problems.

(1) In a positioning system in which a desired band varies in the same frequency, the required receiving band varies even in the same frequency, and therefore circuit portions overlap on a per frequency band basis and current consumption and circuit scale cannot be reduced.

(2) A plurality of receiving systems adopted to positioning systems (for example, the Galileo system and GPS system) are required, and the circuit scale and current consumption increase.

(3) Even when stable positioning is possible in one receiving system, the circuit operation in the other receiving system is not optimized, and current consumption cannot be reduced.

In view of the above, it is an object of the present invention to provide a positioning receiving apparatus that can simplify the circuit configurations of receiving systems supporting a plurality of positioning systems and that can reduce current consumption and circuit scale.

Further, it is also an object of the present invention to provide a positioning receiving apparatus that can optimize the operation of each positioning system to improve the positioning rate and to reduce current consumption.

Means for Solving the Problem

The positioning receiving apparatus according to the present invention employs a configuration which includes: a mixer that supports a plurality of positioning systems and that converts signals received from a plurality of satellites utilized by the plurality of positioning systems, into frequency domain baseband signals; a first low pass filter that is provided subsequent to the mixer and that limits an output signal of the mixer to a first bandwidth; a second low pass filter that is provided on an output port side of the first low pass filter and that limits an output signal of the first low pass filter to a second bandwidth narrower than the first bandwidth; and a signal processing section that performs signal processing of a first baseband signal from the first low pass filter and a second baseband signal from the second low pass filter, to extract positioning data.

ADVANTAGEOUS EFFECTS OF INVENTION

The present invention can simplify the circuit configurations of receiving systems supporting a plurality of positioning systems, and reduce current consumption and circuit scale.

Further, the present invention can optimize the operation of each positioning system to improve the positioning rate and reduce current consumption.

BEST MODE FOR CARRYING OUT THE INVENTION

Hereinafter, embodiments of the present invention will be explained in detail with reference to the accompanying drawings.

Embodiment 1

Figure 3:
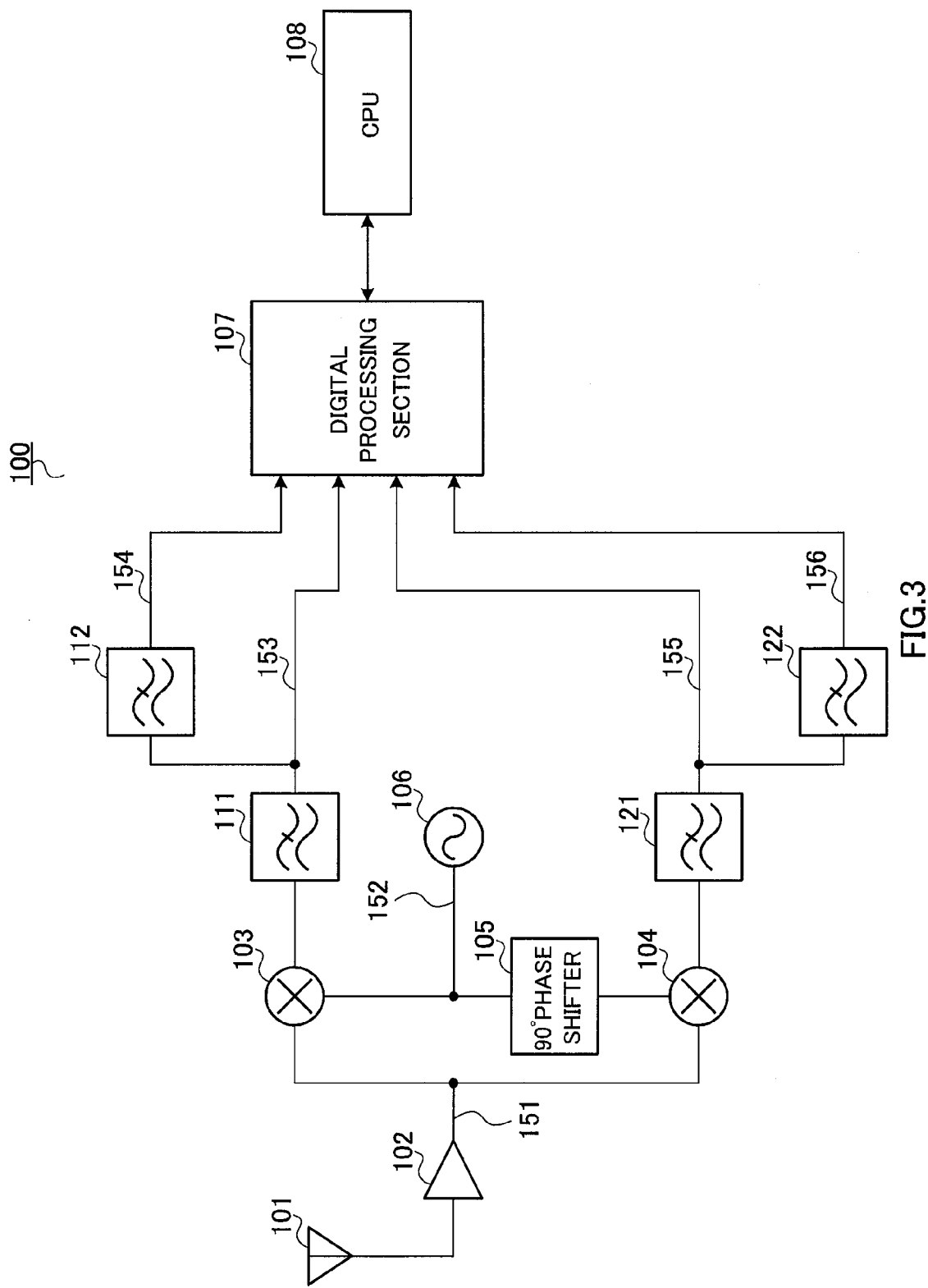
FIG. 3 is a functional block diagram showing the configuration of a positioning receiving apparatus according to Embodiment 1 of the present invention.

FIG. 3 is a functional block diagram showing the configuration of a positioning receiving apparatus according to Embodiment 1 of the present invention. As an example, the present embodiment is applied to satellite positioning systems corresponding to GPS and the Galileo system, as a plurality of positioning systems.

In FIG. 3, positioning receiving apparatus 100 is constituted by: receiving antenna 101; received signal amplifier 102 formed with an LNA; first signal mixer 103 for I-ch and second signal mixer 104 for Q-ch that constitute a quadrature mixer; 90 degree phase shifter 105; local oscillator 106; first I low pass filter 111, which is the first I baseband filter that limits the system of the wider bandwidth (here, the Galileo system) to a desired bandwidth; second I low pass filter 112 that is connected in series subsequent to first I low pass filter 111 and that limits the system of the narrower band (here, GPS) to the desired bandwidth; first Q low pass filter 121, which is the first Q baseband filter that limits the system of the wider bandwidth (here, the Galileo system) to the desired bandwidth; second Q low pass filter 122 that is connected in series subsequent to first Q low pass filter 121 and that limits the system of the narrower bandwidth (here, GPS) to the desired bandwidth; digital processing section 107 that includes a DSP (Digital Signal Processor), ADC (Analog-to-Digital Converter) and so on; and CPU 108.

Received signal amplifier 102 outputs modulated signal 151 to first signal mixer 103 and second signal mixer 104, and local oscillator 106 outputs first local signal 152 to first signal mixer 103 and 90 degree phase shifter 105. 90 degree phase shifter 105 shifts first local signal 152 90 degrees, and outputs first local signal 152 to second signal mixer 104. First signal mixer 103 converts the output signal of received signal amplifier 102 into a frequency-domain I signal, which is the baseband signal of the in-phase component, and outputs the frequency-domain I signal, and converts the output signal of received signal amplifier 102 into a frequency-domain Q signal, which is the baseband signal of the quadrature component, and outputs the frequency-domain Q signal.

First I low pass filter 111 removes high frequency components from the output of first signal mixer 103 through a filter of a wide bandwidth and allows the low frequency components to pass, and outputs the low frequency components as first baseband signal 153 to digital processing section 107 and second I low pass filter 112. Second I low pass filter 112 removes high frequency components from first I baseband signal 153 filtered through first I low pass filter 111 of a wide bandwidth, through a filter of a narrower bandwidth and allows low frequency components to pass, and outputs the low frequency components as second I baseband signal 154 to digital processing section 107.

Similarly, first Q low pass filter 121 removes high frequency components from the output of second signal mixer 104 through a filter of a wide bandwidth and allows low frequency components to pass, and outputs the low frequency components as first Q baseband signal 155 to digital processing section 107 and second Q low pass filter 122. Second Q low pass filter 122 removes high frequency components from first Q baseband signal 155 filtered through first Q low pass filter 121 of a wide bandwidth, through a filter of a narrower bandwidth and allows low frequency components to pass, and outputs the low frequency components as second Q baseband signal 156 to digital processing section 107. First I baseband signal 153, second I baseband signal 154, first Q baseband signal 155 and second Q baseband signal 156, from which high frequency components are removed through the baseband filters, are received as input in digital processing section 107 through A/D converters (not shown).

Figure 4:
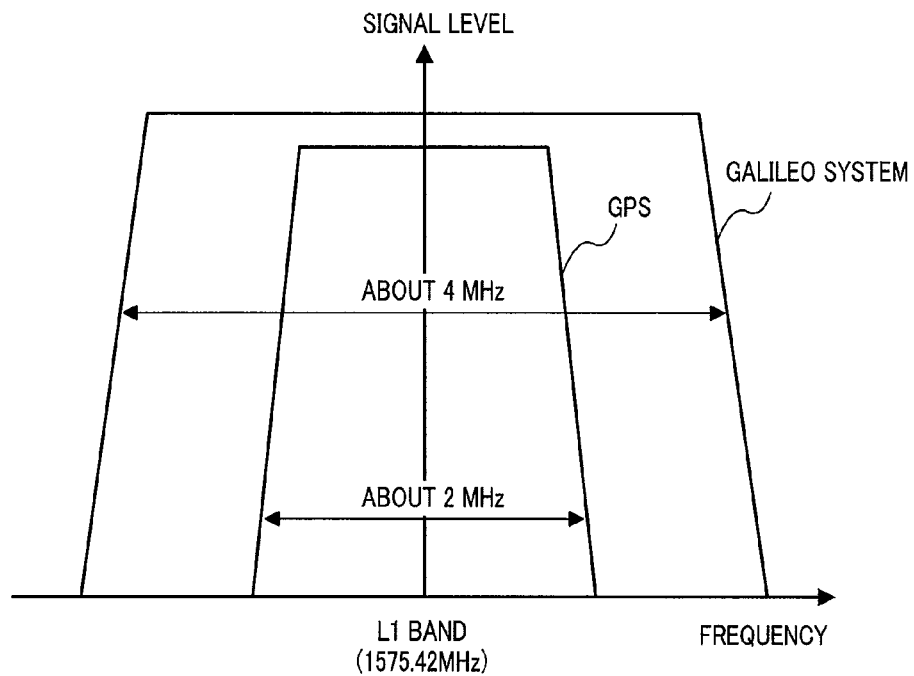
FIG. 4 shows the frequency spectra of the GPS/Galileo system.

As shown in FIG. 4 (described later), the required receiving bandwidth varies between the Galileo system and GPS. The Galileo system requires about a 4 MHz bandwidth, and GPS requires about a 2 MHz bandwidth. Accordingly, it is necessary to configure the optimized positioning receiving section in each system.

The characteristic of the present embodiment lies in the method of configuring the I and Q baseband filters.

(1) First I low pass filter 111 and first Q low pass filter 121 limit the Galileo system of the wider bandwidth to a desired bandwidth, and second low pass filter 112 and second Q low pass filter 122 limit GPS of the narrower bandwidth to the desired bandwidth. That is, the filter bandwidth of first I low pass filter 111 is greater than the filter bandwidth of second I low pass filter, and the filter bandwidth of first Q low pass filter 121 is greater than the filter bandwidth of second Q low pass filter 122.

(2) By setting the filter orders of first I low pass filter 111 and first Q low pass filter 122 high and setting the filter orders of second I low pass filter 112 and second Q low pass filter 122 low, first I low pass filter 111 and first Q low pass filter 121 secure characteristics of attenuating frequencies other than the required bands. Here, the filter order of a filter refers to the number of stages (i.e. the order) formed by the filter, and, when the number of stages in a filter increases, the circuit scale increases, so that it is possible to secure the amount of attenuation of frequencies other than a filter passband. For example, when the filter orders of first I low pass filter 111 and first Q low pass filter 121 are set to the seventh order, the filter orders of second I low pass filter 112 and second Q low pass filter 122 can be set to low orders such as the third order and the fourth order. By this means, it is possible to reduce the circuit scales and current consumption of filters.

In this way, the I and Q baseband filters of the present embodiment are configured to provide second I low pass filter 112 and second Q low pass filter 122 both in parallel and in series with respect to first I low passband filter 111 and first Q low pass filter 121, such that, while second I low pass filter 112 and second Q low band pass filter 122 of narrow bandwidths are connected in series to first I low pass filter 111 and first Q low band pass filter 121 of wide bandwidths, second I low pass filter 112 and second Q low pass filter 122 of narrow bandwidths are connected in parallel with respect to first I and Q baseband signals 153 and 155 from first I low band pass filter 111 and first Q low pass filter 121 of wide bandwidths.

Hereinafter, the operation of positioning receiving apparatus 100 constituted as described above will be explained.

First of all, the basic concept of Embodiment 1 of the present invention will be explained.

Figure 5:
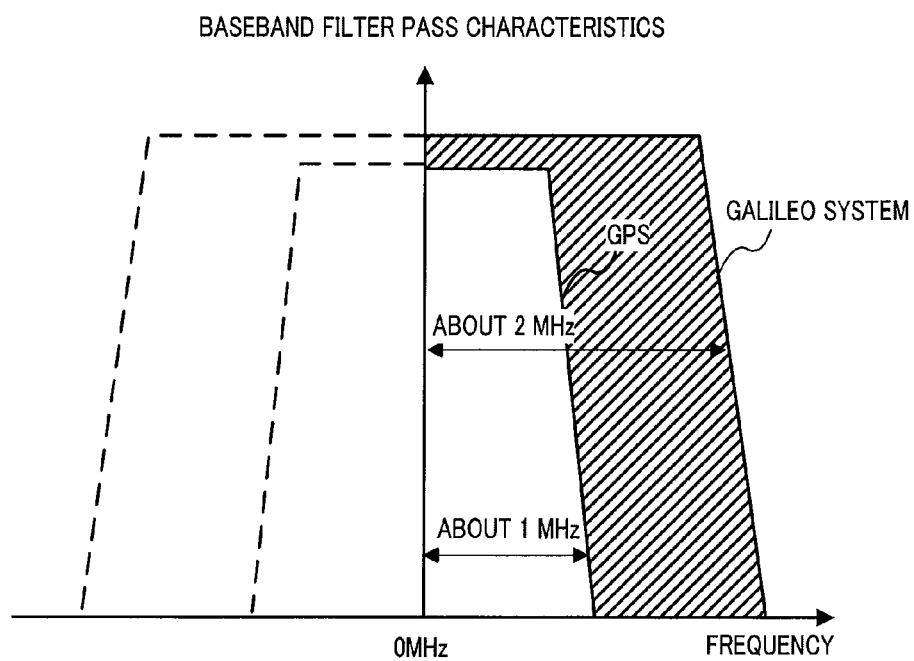
FIG. 5 shows baseband filter characteristics.

FIG. 4 shows the frequency spectra of GPS and the Galileo system, and FIG. 5 shows baseband filter characteristics. The amount of attenuation is normalized based on the amount of attenuation in the baseband filter at 0 MHz, and is represented by the lower direction of the vertical axis.

The required receiving bandwidth varies between GPS and the Galileo system, and the Galileo system requires about a 4 MHZ bandwidth and GPS requires about a 2 MHz bandwidth. When the frequency spectrum is observed based mainly on the L1 band (1575.42 MHz), which is an existing civilian frequency band, the Galileo system has a wider frequency band (about 4 MHz) than the frequency band of GPS (about 2 MHz) and also has a higher signal level as shown in FIG. 4.

Further, a direct conversion scheme down-converts frequencies into the baseband. With the present embodiment, first signal mixer 103 and second signal mixer 104 perform down-conversion. With the direct conversion scheme, the negative frequency band is folded to overlap the positive frequency band as shown by the broken lines in FIG. 5. As a result, the frequency band itself is cut off to half. In this case, the Galileo system requires about a 2 MHz, and GPS requires about an 1 MHz as the bandwidth of the baseband filter.

The inventors of the present invention have focused on removing the portion of the difference between the frequency bands of the Galileo system and GPS (see the hatching portion in FIG. 5). Signals in the frequency band corresponding to the hatching portion in FIG. 5 are signal components that are unnecessary on the GPS side and these unnecessary signals in this bandwidth are processed, and therefore noise increases and sensitivity deteriorates accordingly. Therefore, by adjusting the frequency band (about 2 MHz) of the baseband filter of the Galileo system to the frequency band (about 1 MHz) of the baseband filter of GPS or making the frequency band of the Galileo system match with the frequency band of GPS, signals in the frequency band corresponding to the hatching portion in FIG. 5 are removed and performance deterioration in GPS reception is prevented. Consequently, with the present embodiment, the configuration in FIG. 3 connects second I low band pass filter 112 and second Q low pass filter 122 of narrow bandwidths subsequent to first I low band pass filter 111 and first Q low pass filter 121 of wide bandwidths, so that, when used in GPS, the frequency band corresponding to the hatching portion in FIG. 5 is removed through second I low pass filter 112 and second Q low pass filter 122 of narrow bandwidths.

Next, the operation of positioning receiving apparatus 100 will be explained using FIG. 3.

A high frequency signal received at receiving antenna 101 is amplified in received signal amplifier 102 formed with an LNA and is inputted as modulated signal 151 in first signal mixer 103 and second signal mixer 104 constituting the quadrature mixer.

90 degree phase shifter 105 supplies first local signal 152 as is to first signal mixer 103, from local oscillator 106 that performs oscillation at the same frequency as the carrier frequency, and shifts first local signal 152 from local oscillator 106 90 degrees and supplies first local signal 152 to second signal mixer 104. As a result, first signal mixer 103 converts the output signal of received signal amplifier 102 into the frequency-domain I signal, which is the baseband signal of the in-phase component and outputs the frequency-domain I signal, and second signal mixer 104 converts the output signal of received signal amplifier 102 into the frequency-domain Q signal, which is the baseband signal of the quadrature component, and outputs the frequency-domain Q signal.

While the I signal from first signal mixer 103 is limited to the frequency band (about 1 MHz) of a narrower band of GPS through first I low pass filter 111 and second I low band pass filter 112 and is inputted as second I baseband signal 154 to digital processing section 107, only first I low pass filter 111 is used to limit the I signal to the frequency band (about 2 MHz) of a wider bandwidth of the Galileo system, that is to say, second I low pass filter 112 is bypassed, the I signal is inputted as first I baseband signal 153 to digital processing section 107. Here, the I signal from first signal mixer 103 is subjected to processing for removing high frequency components through first I low pass filter 111 and second I low pass filter 112, or through first I low pass filter 111, and is received as input in digital processing section 107.

Similarly, while the Q signal from second signal mixer 104 is limited to the frequency band (about 1 MHz) of a narrower bandwidth of GPS through first Q low pass filter 121 and second Q low pass filter 122 and is inputted as second Q baseband signal 156 to digital processing section 107, only first Q low pass filter 121 is used to limit the Q signal to the frequency band (about 2 MHz) of a wider bandwidth of the Galileo system, that is to say, second Q low pass filter 122 is bypassed, the Q signal is inputted as first Q baseband signal 155 to digital processing section 107. Similar to the case of the I signal, the Q signal from second signal mixer 104 is subjected to processing for removing high frequency components through first Q low pass filter 121 and second Q low pass filter 122, or through first Q low pass filter 121, and is received as input by digital processing section 107.

Digital processing section 107 performs digital signal processing of first I baseband signal 153 from first I low pass filter 111, second I baseband signal 154 from second I low pass filter 112, first Q baseband signal 155 from first Q low pass filter 121 and second Q baseband signal 156 from second Q low pass filter 122, to extract data. The extracted data is outputted to CPU 108. CPU 108 performs arithmetic calculation processing for calculating a positioned location. Further, in an embodiment other than the present embodiment, the same processing may be performed by integrating digital processing section 107 and CPU 108.

As shown in FIG. 4, the receiving band required at the same frequency (L1=1575.42 MHz) varies between the Galileo system and GPS, and the Galileo system requires about 4 MHz and GPS requires about 2 MHz. According to the present embodiment, the first I and Q baseband filters employ first I low pass filter 111 and first Q low pass filter 121 of wide bands in the system of the wider bandwidth (here, the Galileo system), and employ second I low pass filter 112 and second Q low pass filter 122 that limit the system of the narrower bandwidth (here, GPS). That is, the filter bandwidth of first I low pass filter 111 is greater than the filter bandwidth of second I low pass filter 112 and the filter bandwidth of first Q low pass filter 121 is greater than the filter bandwidth of second Q low pass filter 122, so that it is possible to reduce the circuit scales and current consumption by sharing common circuit portions.

Particularly, the present embodiment is configured to set the filter orders of first I low pass filter 111 and first Q low pass filter 121 high and set the filter orders of second I low pass filter 112 and second Q low pass filter 122 low. By this means, it is possible to secure high attenuation characteristics thanks to first I low pass filter 111 and first Q low pass filter 121 of high filter orders, optimize frequency characteristics of the system such as the Galileo system that requires a wider bandwidth, improve the performance of GPS and the Galileo system against interference from outside bands and secure the required S/N. Securing the required S/N can be realized by removing signals in the frequency band corresponding to the above hatching portion in FIG. 5.

Figure 1:
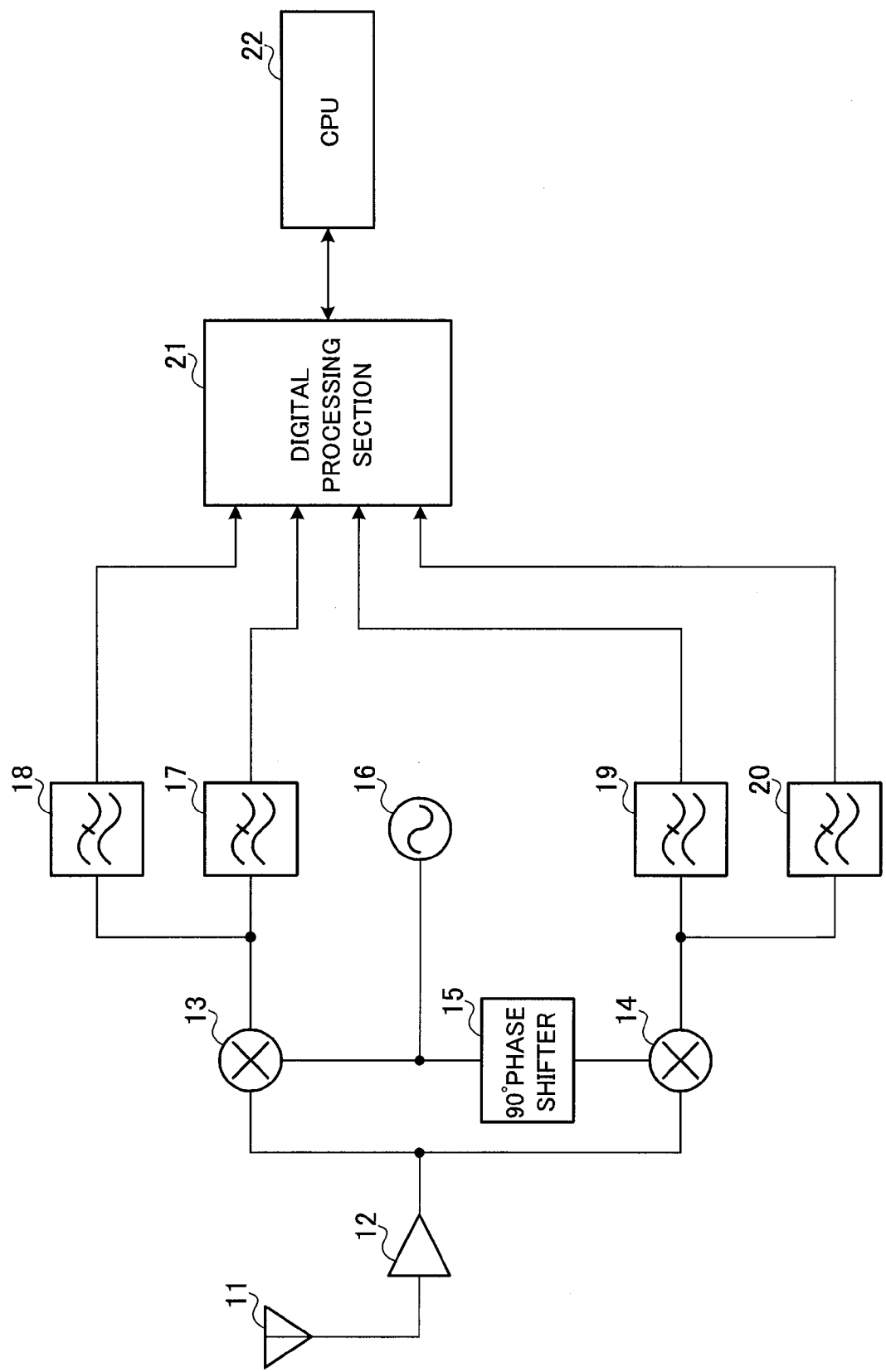
FIG. 1 is a functional block diagram showing a conventional positioning receiving apparatus having a plurality of receiving bands.
Figure 2:
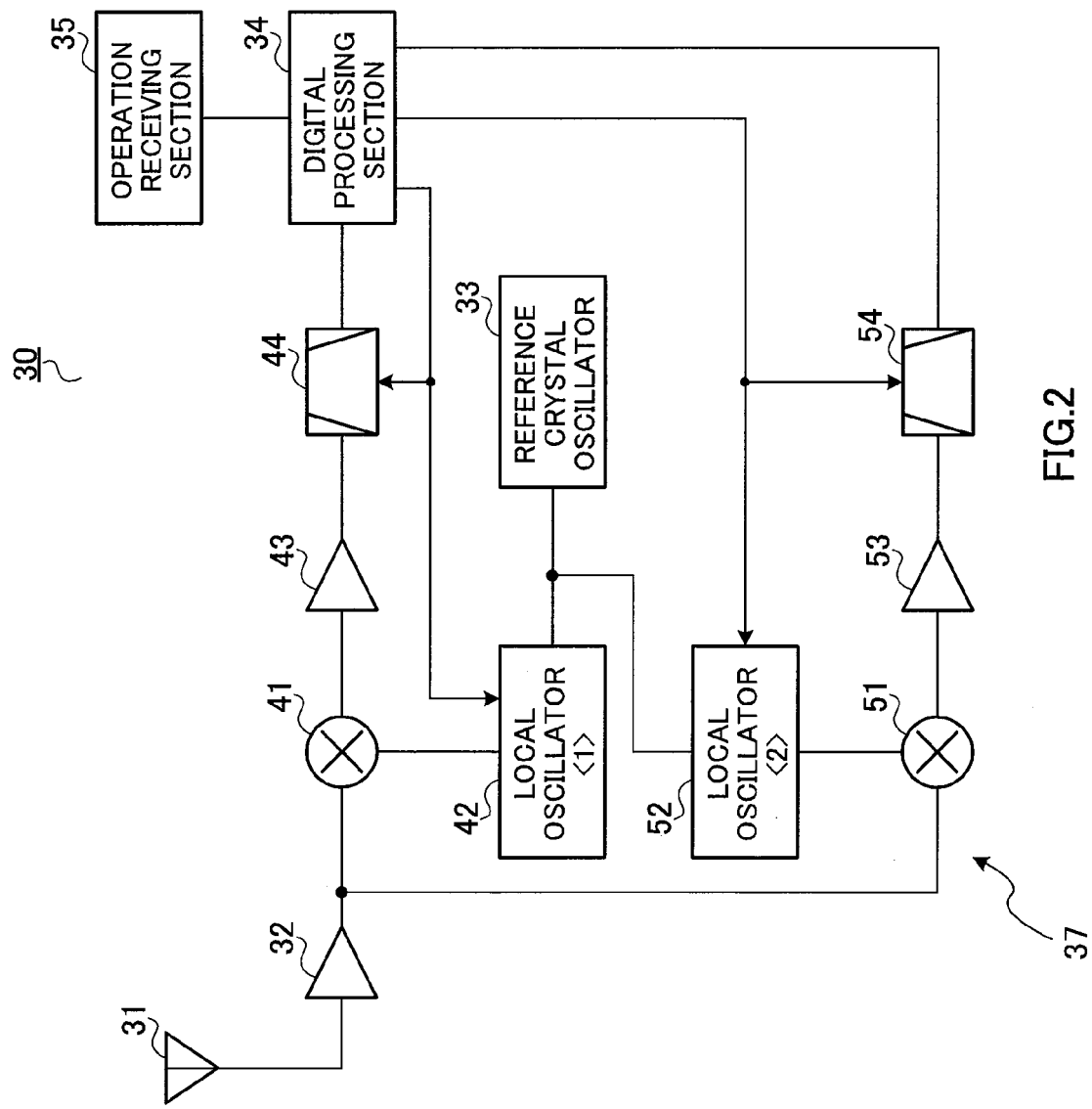
FIG. 2 is a block diagram showing a schematic configuration of a conventional positioning signal receiving apparatus with two receiving processing systems.

Further, second I low pass filter 112 and second Q low pass filter 122 are configured to set filter orders low and can optimize the frequency characteristics of the system such as GPS that requires a narrower bandwidth, so that it is possible to reduce overlapping circuit portions in the overall configuration and reduce the circuit scales and current consumption. For example, as in the conventional example in FIG. 1, in case where a parallel configuration is simply employed, if the filter orders of first I low pass filter 17 and first Q low pass filter 19 are set to the seventh order, the filter orders of second I low pass filter 18 and second Q low pass filter 20 are set to the seventh order, thereby increasing the circuit scales and current consumption. By contrast with this, with the present embodiment, if the filter orders of first I low pass filter 111 and first Q low pass filter 121 are set to, for example, the seventh order, the filter orders of second I low pass filter 112 and second Q low pass filter 122 are set to equal to less than the seventh order such as the third order or the fourth order, so that it is possible reduce the circuit scales and current consumption while the required attenuation characteristics are secured.

Embodiment 2

The basic configuration of the positioning receiving apparatus has been explained with Embodiment 1. A method of controlling a plurality of positioning systems will be explained with Embodiment 2.

Figure 6:
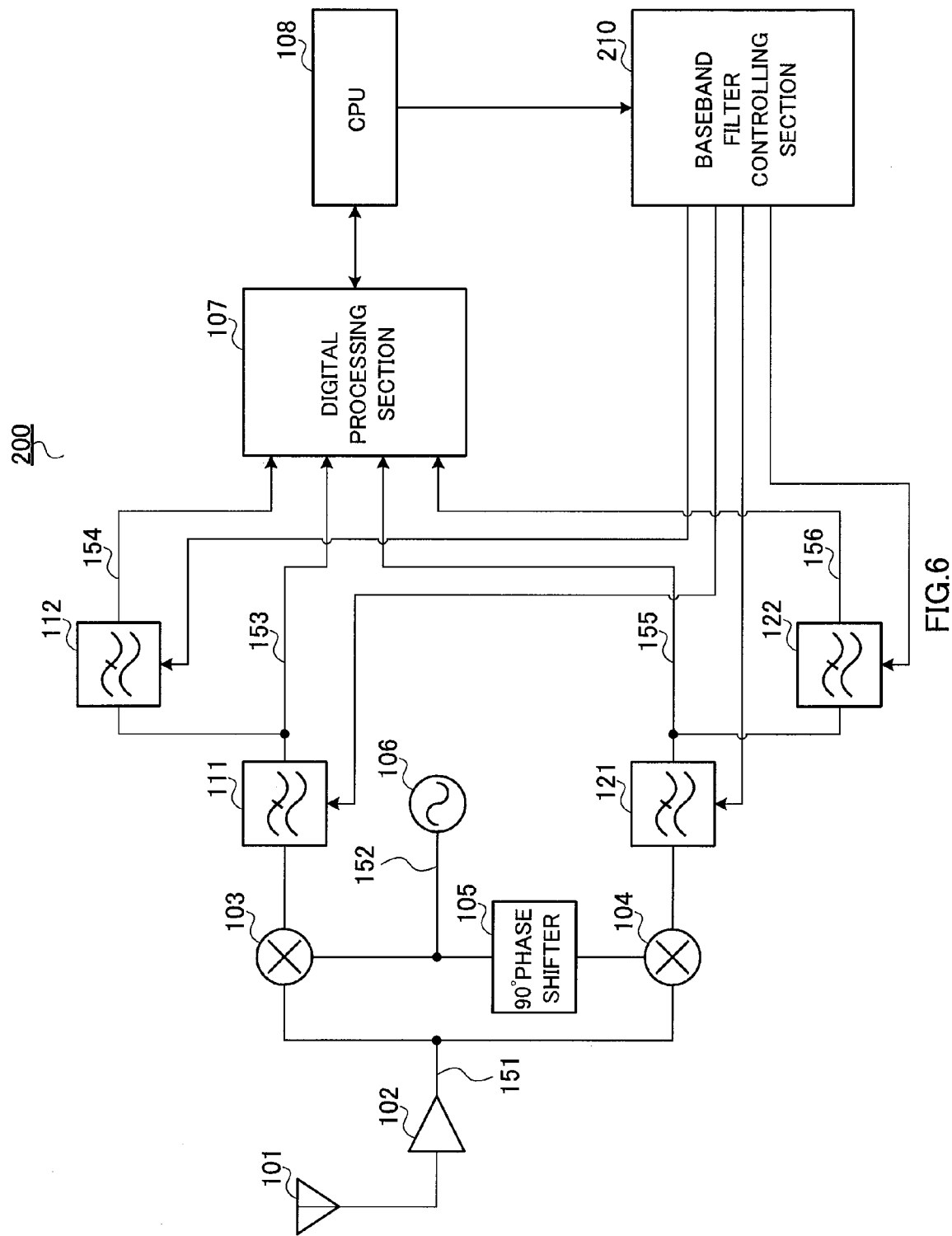
FIG. 6 is a functional block diagram showing the configuration of the positioning receiving apparatus according to Embodiment 2 of the present invention.

FIG. 6 is a functional block diagram showing the configuration of the positioning receiving apparatus according to Embodiment 2 of the present invention. The same components as in FIG. 3 will be assigned the same reference numerals to explain the present embodiment, and explanation of the overlapping components will be omitted.

In FIG. 6, positioning receiving apparatus 200 is constituted by: receiving antenna 101; received signal amplifier 102; first signal mixer 103 for I-ch; second signal mixer 104 for Q-ch; 90 degree phase shifter 105; local oscillator 106; first I low pass filter 111, which is the first I baseband filter that limits the system of the wider bandwidth (here, the Galileo system) to the desired bandwidth; second I low pass filter 112 that is connected in series subsequent to first I low pass filter 111 and that limits the system of the narrower bandwidth (here, GPS) to the desired bandwidth; first Q low pass filter 121, which is the first Q baseband filter that limits the system of the wider bandwidth (here, the Galileo system) to the desired bandwidth; second Q low pass filter 122 that is connected in series subsequent to first Q low pass filter 121 and that limits the system of the narrower bandwidth (here, GPS) to the desired bandwidth; digital processing section 107; CPU 108; and baseband filter controlling section 210.

Baseband filter controlling section 210 controls the I and Q baseband filters adopted to the Galileo system and GPS, to improve the positioning rate and reduce current consumption. Baseband filter controlling section 210 performs a control to adopt first I low pass filter 111 and first Q low pass filter 121 to the wider bandwidth of the Galileo system, and performs a control to adopt second I low pass filter 112 and second Q low pass filter 122 to the narrower bandwidth of GPS in addition to first I low pass filter 111 and first Q low pass filter 121.

Hereinafter, the operation of positioning receiving apparatus 200 constituted as described above will be explained.

[Dual Receiving Operation (Hereinafter "Dual Operation")→Single Receiving Operation (Hereinafter "Single Operation")]

With the present embodiment, baseband filter controlling section 210 performs a baseband filter control of performing "dual operation" of operating both GPS and the Galileo system when positioning is started, and, when the state where stable positioning is possible continues, performs "single operation" of stopping the receiving operation of one of GPS and the Galileo system. By this means, the positioning rate is improved and current consumption is reduced.

Figure 7:
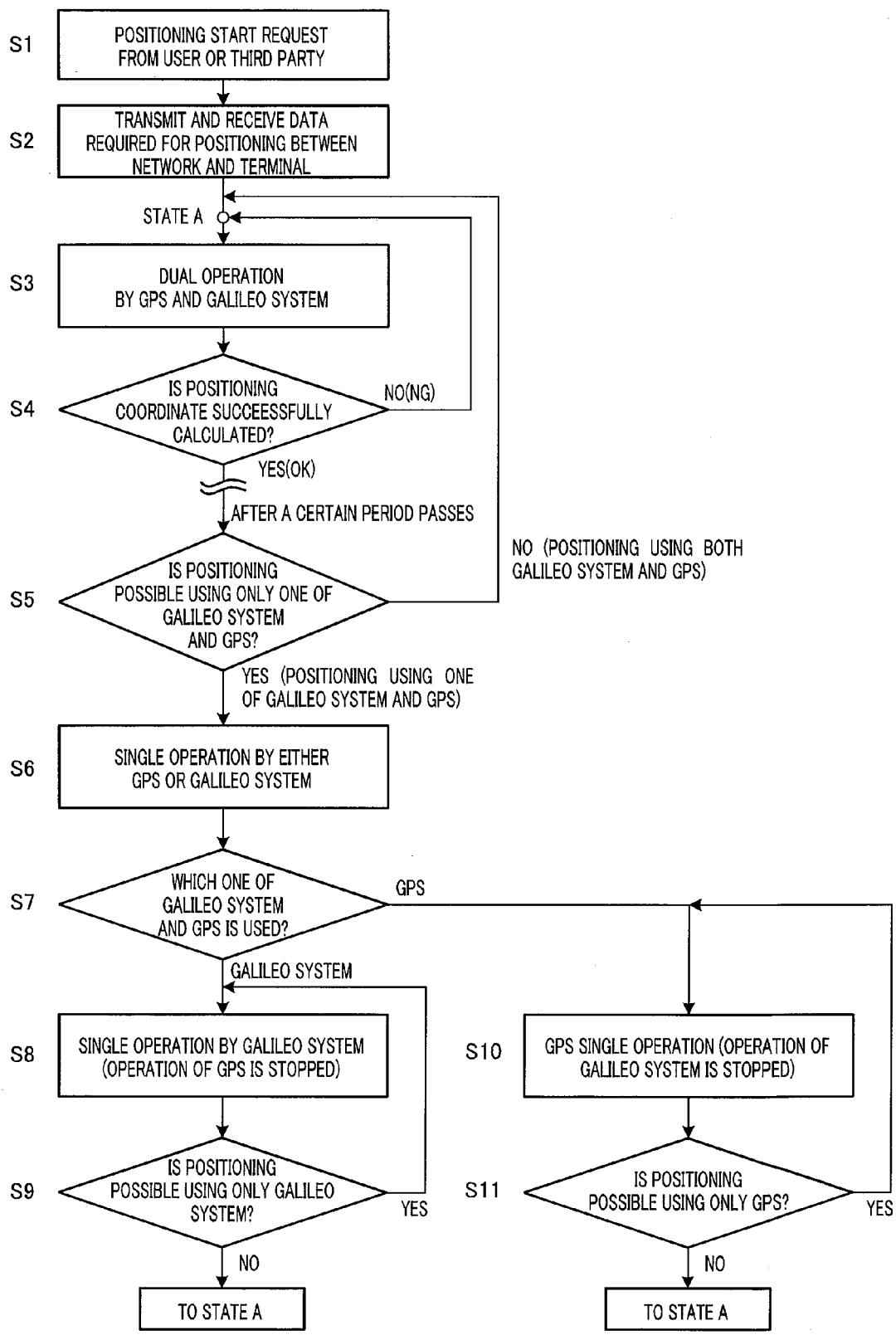
FIG. 7 is a flowchart showing a filter control from dual operation to single operation in a baseband filter controlling section of the above positioning receiving apparatus according to Embodiment 2.

FIG. 7 is a flowchart showing a filter control from dual operation to single operation in baseband filter controlling section 210. "S" in FIG. 7 shows each step of the flowchart. When baseband filter controlling section 210 is constituted by a microprocessor, this flowchart is a program executed by a microprocessor and, when baseband filter controlling section 210 is constituted by hardware, this flowchart is a control sequence by hardware. Meanwhile, although baseband filter controlling section 210 and CPU 108 are separate components in FIG. 6, they may be integrated. In this case, this flowchart is executed by CPU 108.

First, when a positioning start request is received from the user or third party in step S1, data required for positioning is transmitted and received between a network and a terminal in step S2 and the system enters "state A."

In "state A," dual operation for operating both GPS and the Galileo system is performed (step S3). To be more specific, dual operation of GPS and the Galileo system is as follows. Baseband filter controlling section 210 operates both first I low pass filter 111 and first Q low pass filter 121, and second I low pass filter 112 and second Q low pass filter 122, and outputs, to digital processing section 107, first I baseband signal 153, second I baseband signal 154, first Q baseband signal 155 and second Q baseband signal 156 from which high frequency components in bandwidths are removed. Digital processing section 107 performs digital signal processing of first I baseband signal 153 from first I low pass filter 111, second I baseband signal 154 from second I low pass filter 112, first Q baseband signal 155 from first Q low pass filter 121 and second Q baseband signal 156 from second Q low pass filter 122, to extract data of GPS and the Galileo system by dual operation of GPS and the Galileo system. The extracted data of GPS and the Galileo system is outputted to CPU 108, and CPU 108 performs arithmetic calculation processing for calculating the positioned location both in GPS and the Galileo system.

Back to the flowchart of FIG. 7, whether or not the positioning coordinate is successfully calculated by GPS or the Galileo system is decided, and, if the positioning coordinate is not successfully calculated by GPS or the Galileo system, the system returns to "state A" and continues dual operation of GPS and the Galileo system.

When the positioning coordinate is successfully calculated by GPS or the Galileo system, after a predetermined period passes, whether or not positioning is possible using only one of the Galileo system and GPS is decided in step 5, and, if positioning is not possible using only one of the Galileo system and GPS, the system returns to "state A" and continues dual operation of GPS and the Galileo system. In this case, positioning is performed using both the Galileo system and GPS. Practically, the state of one of the Galileo system and GPS is able to perform positioning and this state is continued. Moreover, there is a case where, although there is a positioning start request from the user or third party to start positioning using a specific positioning system, positioning is not possible using the above specific positioning system. For example, this is a case where, when there is a positioning start request to start positioning using the Galileo system, although positioning is possible using GPS, positioning is not possible using the Galileo system. In such a case, the system returns to "state A."

If positioning is possible using only one of the Galileo system and GPS in above step S5, the flow proceeds to positioning processing using either the Galileo system or GPS after step S5.

That is, single operation of operating one of GPS and the Galileo system is performed in step S6, and which one of the Galileo system and GPS is operated, is decided in step S7. Which one of the Galileo system and GPS starts positioning can be set at random according to positioning start setting. The positioning start setting will be described later in detail in Embodiment 4.

When the positioning operation is performed using the Galileo system, single operation is performed by the Galileo system in step S8, and the operation of GPS which is not selected to reduce current consumption is stopped. To be more specific, single operation of the Galileo system is as follows. Baseband filter controlling section 210 operates first I low pass filter 111 and first Q low pass filter 121 to output, to digital processing section 107, first I baseband signal 153 and first Q baseband signal 155 from which high band components in wide bandwidths are removed. At this time, baseband filter controlling section 210 stops the operations of second I low pass filter 112 and second Q low pass filter 122. The operations of these second I low pass filter 112 and second Q low pass filter 122 are stopped by, for example, performing a bypass switch of bypassing second I low pass filter 112 and second Q low band pass filter 122 and then stopping the supply of power to these second I low pass filter 112, second Q low pass filter 122 and A/D converters. Digital processing section 107 performs digital signal processing of first I baseband signal 153 from first I low pass filter 111 and first Q baseband signal 155 from first Q low pass filter 121, to extract data of the Galileo system. The extracted data of the Galileo system is outputted to CPU 108, and CPU 108 performs arithmetic calculation processing for calculating the positioned location using only the data of the Galileo system.

Next, whether or not positioning is possible using only the Galileo system is decided in step S9, and, if positioning is possible using only the Galileo system, the flow returns to above step S8 and continues the positioning operation using only the Galileo system. If positioning is not possible using only the Galileo system, the system returns to "state A" and checks whether or not positioning is possible using the other system (in this case, GPS).

By contrast with this, if the positioning operation is performed by GPS in above step S7, single operation is performed using GPS in step S10, and the operation of GPS which is not selected to reduce current consumption is stopped. To be more specific, single operation of GPS is as follows. Baseband filter controlling section 210 operates both first I low pass filter 111 and first Q low pass filter 121, and second I low band pass filter 112 and second Q low pass filter 122, and outputs, to digital processing section 107, second I baseband signal 154 and second Q baseband signal 156 from which high band frequency components in narrow bandwidths are removed. At this time, baseband filter controlling section 210 stops the operations of second I low pass filter 112 and second Q low pass filter 122. The operations of these second I low pass filter 112 and second Q low pass filter 122 are stopped by, for example, performing a bypass switch of bypassing second I low pass filter 112 and second Q low pass filter 122 and then stopping the supply of power to A/D converters that perform A/D conversion of first I baseband signal 153 and first Q low baseband signal 155. Digital processing section 107 performs digital signal processing of second I baseband signal 154 from second I low pass filter 112 and second Q baseband signal 156 from second Q low baseband filter 122, to extract data of GPS. The extracted data of GPS is outputted to CPU 108, and CPU 108 performs arithmetic calculation processing for calculating the positioned location using only the data of GPS.

Next, whether or not positioning is possible using only GPS is decided in step S11, and, if positioning is possible using only GPS, the flow returns to above step S10 and continues the positioning operation using only GPS. If positioning is not possible using only GPS, the system returns to "state A" and whether or not positioning is possible using the other system (in this case, the Galileo system) is checked.

In this way, according to the present embodiment, when positioning is started, if both GPS and the Galileo system are operated and a state where stable positioning is possible continues, a baseband filter control is performed to stop the receiving operation of one of GPS and the Galileo system to proceed to single operation, so that it is possible to improve the positioning rate when positioning is started and reduce current consumption after positioning is started.

Embodiment 3

The control method from dual operation to single operation has been explained with Embodiment 2. The control method from single operation to dual operation will be explained with Embodiment 3.

The hardware configuration of the positioning receiving apparatus according to Embodiment 3 of the present invention is the same as in FIG. 6, and therefore explanation thereof will be omitted.

In above FIG. 6, baseband filter controlling section 210 performs a control to adopt first I low pass filter 111 and first Q low pass filter 121 in the Galileo system of the wider bandwidth, and performs a control to adopt second I low pass filter 112 and second Q low pass filter 122 in GPS of the narrower bandwidth in addition to first I low pass filter 111 and first Q low pass filter 121.

The present embodiment further reduces current consumption by starting the positioning operation using one of the Galileo system and GPS. To be more specific, the positioning operation is started using one of the Galileo system and GPS, and, if positioning is not possible using one system, positioning is performed using the other system, and, if positioning is not yet possible using the other system, single operation is switched to dual operation.

Figure 8:
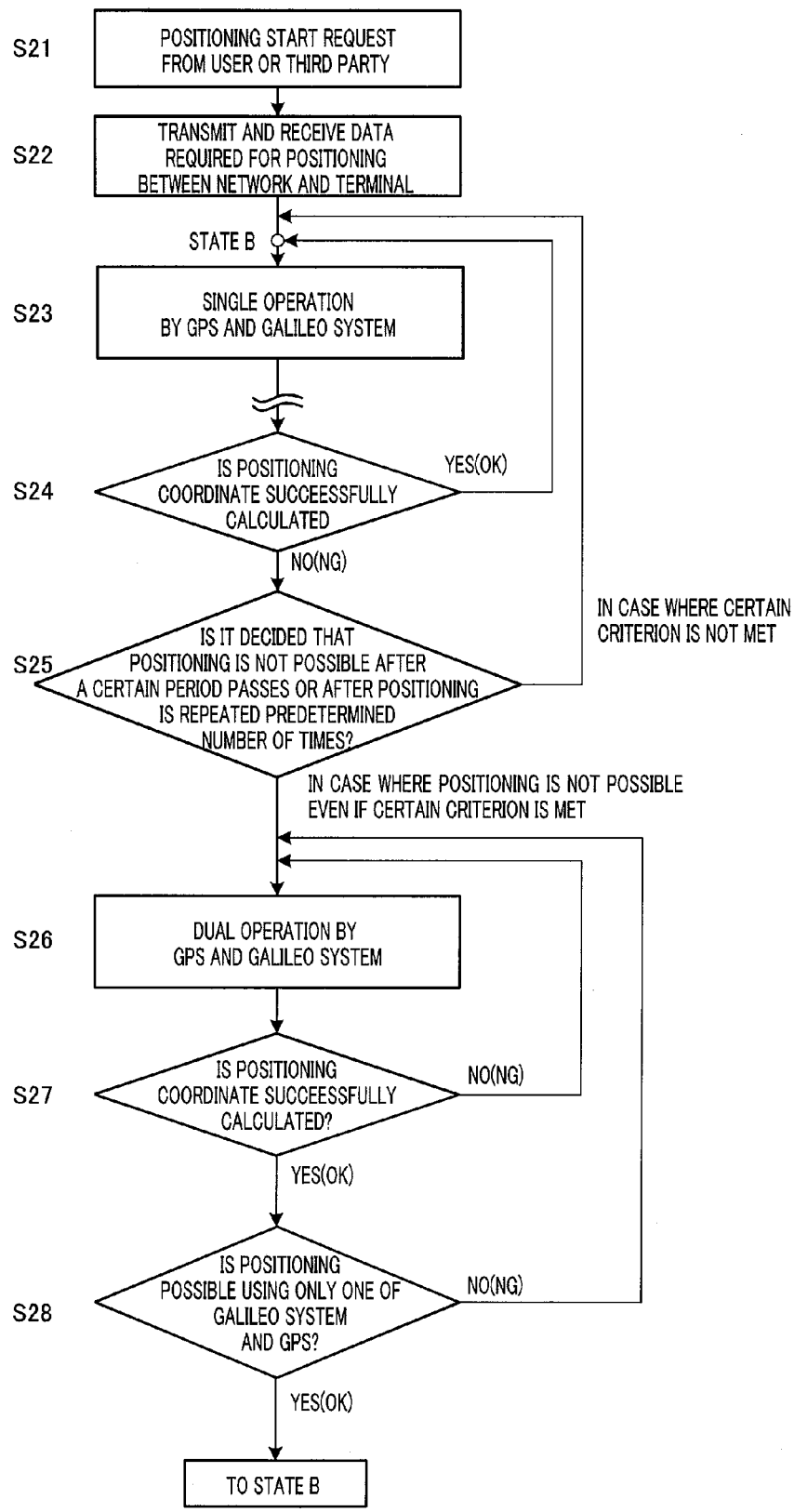
FIG. 8 is a flowchart showing a filter control from single operation to dual operation in the baseband filter controlling section of the positioning receiving apparatus according to Embodiment 3 of the present invention.

FIG. 8 is a flowchart showing a filter control from single operation to dual operation in baseband filter controlling section 210.

First, when a positioning start request is received from the user or third party in step S21, data required for positioning is transmitted and received between the network and terminal in step S22, and the system enters "state B."

In "state B," single operation of operating either GPS or the Galileo system, is performed (step S23). To be more specific, single operation of GPS or the Galileo system is as follows. In single operation of GPS, baseband filter controlling section 210 operates both first I low pass filter 111 and first Q low pass filter 121, and second I low pass filter 112 and second Q low pass filter 122, and outputs, to digital processing section 107, first I baseband signal 153, second I baseband signal 154, first Q baseband signal 155 and second Q baseband signal 156 from which low frequency components in narrow bandwidths are removed. By contrast with this, single operation of the Galileo system operates only first I low pass filter 111 and first Q low pass filter 121, and outputs, to digital processing section 107, first I baseband signal 153 and first Q baseband signal 155 from which low frequency components in wide bandwidths are removed. Digital processing section 107 performs digital signal processing of first I baseband signal 153 from first I low pass filter 111, second I baseband signal 154 from second I low pass filter 112, first Q baseband signal 155 from first Q low pass filter 121 and second Q baseband signal 156 from second Q low pass filter 122, to extract data of GPS or the Galileo system by single operation of GPS or the Galileo system. The extracted data of GPS or the Galileo system is outputted to CPU 108, and CPU 108 performs arithmetic calculation processing in either GPS or the Galileo system for calculating the positioned location.

Back to the flowchart in FIG. 8, whether or not the positioning coordinate is successfully calculated by GPS or the Galileo system is decided in step S24 and, if the positioning coordinate is successfully calculated by GPS or the Galileo system, the system returns to "state B" and continues single operation of GPS or the Galileo system.

If the positioning coordinate is successfully calculated by GPS or the Galileo system, the system returns to "state B" and continues single operation of GPS or the Galileo system. In this case, positioning is performed using both the Galileo system and GPS. Practically, the state of one of the Galileo system and GPS is able to perform positioning and this state is continued.

If the positioning coordinate is not successfully calculated by GPS or the Galileo system in above step S24, whether or not positioning is not possible even if a certain criterion is met is decided and, if a certain criterion is not met, the system returns to "state B" and continues single operation of GPS or the Galileo system. This criterion includes cases where (1) the positioning coordinate cannot be calculated after a predetermined period passes and (2) the positioning coordinate cannot be calculated even if positioning is repeated a predetermined number of times. Further, this criterion also includes a case where, although there is a positioning start request from the user or third party to start positioning using a specific positioning system, positioning is not possible using the above specific positioning system. This case refers to, for example, a case where, when there is a positioning start request to start positioning using the Galileo system, although positioning is possible using GPS, positioning is not possible using the Galileo system. In such a case, too, the system returns to "state B."

If, in above step S25, positioning is not possible even after a certain criterion is met, dual operation of operating both GPS and the Galileo system is operated in step S26. Dual operation of GPS and the Galileo system has been described with reference to the flowchart in FIG. 7.

In step S27, whether or not the positioning coordinate is successfully calculated by GPS or the Galileo system is decided and, if the positioning coordinate is not successfully calculated by GPS or the Galileo system, the flow returns to above step S26, and continues dual operation of GPS and the Galileo system.

If the positioning coordinate is successfully calculated by GPS or the Galileo system, whether or not positioning is possible using one of the Galileo system and GPS is decided in step S28, and, if positioning is not possible using only one of the Galileo system and GPS, the flow returns to above step S26 and continues dual operation of GPS and the Galileo system.

If the positioning coordinate is successfully calculated by GPS or the Galileo system in above step S27, whether or not positioning is possible using only one of the Galileo system or GPS is decided in step S28.

If positioning is not possible using only one of the Galileo system and GPS, the flow returns to above step S26 and continues dual operation. If positioning is possible using only one of the Galileo system and GPS, the system returns to "state B" and continues single operation of GPS and the Galileo system.

In above-described single operation, which one of the Galileo system and GPS starts positioning can be set randomly according to positioning start setting. The positioning start setting will be described later in detail in Embodiment 4.

Here, if single operation is performed by the Galileo system, the operation of GPS which is not selected to reduce current consumption is stopped. To be more specific, single operation of the Galileo system is as follows. Baseband filter controlling section 210 operates first I low pass filter 111 and first Q low pass filter 121, and outputs, to digital processing section 107, first I baseband signal 153 and first Q baseband signal 155 from which high frequency components in wide bandwidths are removed. At this time, baseband filter controlling section 210 stops the operations of second I low pass filter 112 and second Q low pass filter 122. The operations of these second I low pass filter 112 and second Q low pass filter 122 are stopped by, for example, performing a bypass switch of bypassing second I low pass filter 112 and second Q low pass filter 122 and then stopping the supply of power to these second I low pass filter 112 and second Q low pass filter 122, and A/D converters. Digital processing section 107 performs digital signal processing of first I baseband signal 153 from first I low pass filter 111 and first Q baseband signal 155 from first Q low pass filter 121, to extract data of the Galileo system. The extracted data of the Galileo system is outputted to CPU 108, and CPU 108 performs arithmetic calculation processing for calculating the positioned location.

Further, when single operation is performed by GPS, the operation of GPS which is not selected to reduce current consumption is stopped. To be more specific, single operation of GPS is as follows. Baseband filter controlling section 210 operates both first I low pass filter 111 and first Q low pass filter 121, and second I low pass filter 112 and second Q low pass filter 122, and outputs, to digital processing section 107, second I baseband signal 154 and second Q baseband signal 156 from which high frequency components in narrow bandwidths are removed. At this time, baseband filter controlling section 210 stops the operations of second I low pass filter 112 and second Q low pass filter 122. The operations of these second I low pass filter 112 and second Q low pass filter 122 are stopped by, for example, performing a bypass switch of bypassing second I low pass filter 112 and second Q low pass filter 122 and then stopping the supply of power to A/D converters which perform A/D conversion of first I baseband signal 153 and first Q baseband signal 155. Digital processing section 107 performs digital signal processing of second I baseband signal 154 from second I low pass filter 112 and second Q baseband signal 156 from second Q low pass filter 122, to extract data of GPS. The extracted data of GPS is outputted to CPU 108, and CPU 108 performs arithmetic calculation processing for calculating the positioned location using only the data of GPS.

In this way, according to the present embodiment, when positioning is started, the receiving operation is started by single operation of GPS or the Galileo system, the receiving operation is started by the other positioning system if positioning is not possible using one positioning system (for example, positioning is first started using GPS and positioning is started using the Galileo system if positioning is not possible), and a baseband filter control is performed to switch single operation to dual operation if positioning is not yet possible, so that it is possible to reduce current consumption when positioning is started and realizes much lower current consumption.

Embodiment 4

The positioning start setting in dual operation or single operation will be explained in detail with Embodiment 4.

The hardware configuration of the positioning receiving apparatus according to Embodiment 4 of the present invention is the same as in FIG. 6, and explanation thereof will be omitted.

Positioning Start Setting Example 1

Figure 9:
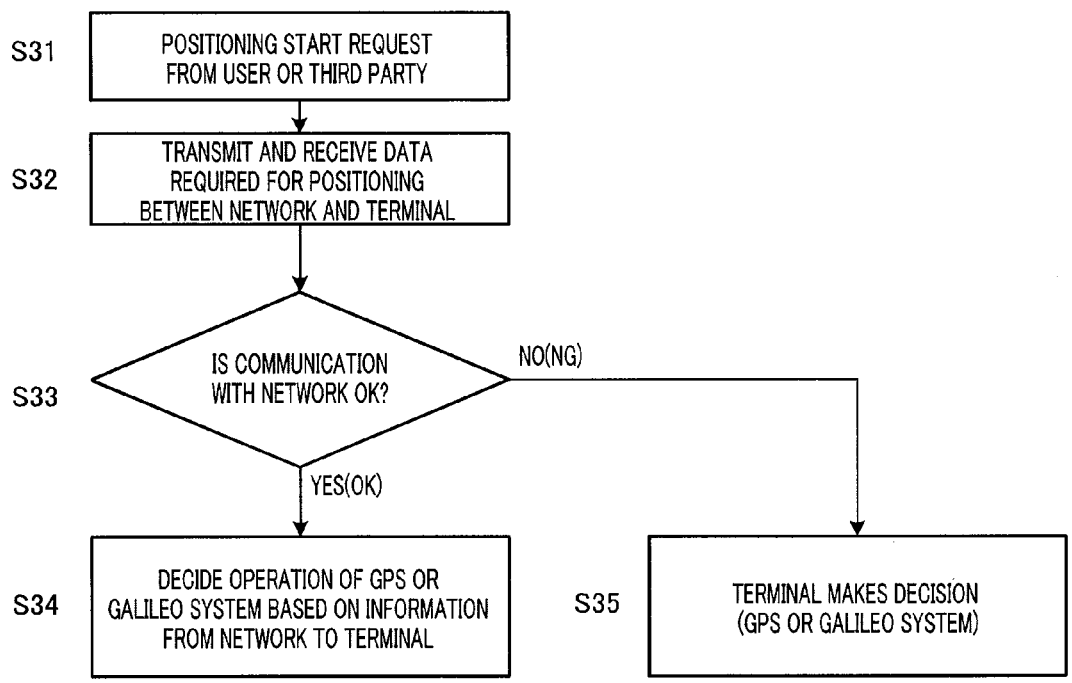
FIG. 9 is a flowchart showing a positioning start setting control in dual operation or single operation of the positioning receiving apparatus according to Embodiment 4 of the present invention.

FIG. 9 is a flowchart showing a positioning start setting control in dual operation or single operation.

First, when a positioning start request is received from the user or third party in step S31, data required for positioning is transmitted and received between the network and terminal in step S32.

Whether or not communication with the network is possible is decided in step S33, and, if communication with the network is possible, the positioning operation in dual operation or single operation is controlled based on information between the network and terminal in step S34. For example, a terminal performs a control to preferentially operate GPS based on information from the network. If communication with the network is not possible, in step S35, the terminal performs a positioning start operation set in advance. This positioning operation setting can be set in advance by the user or third party.

By this means, it is possible to control the positioning operation based on information between the network and terminal.

Positioning Start Setting Example 2

Figure 10:
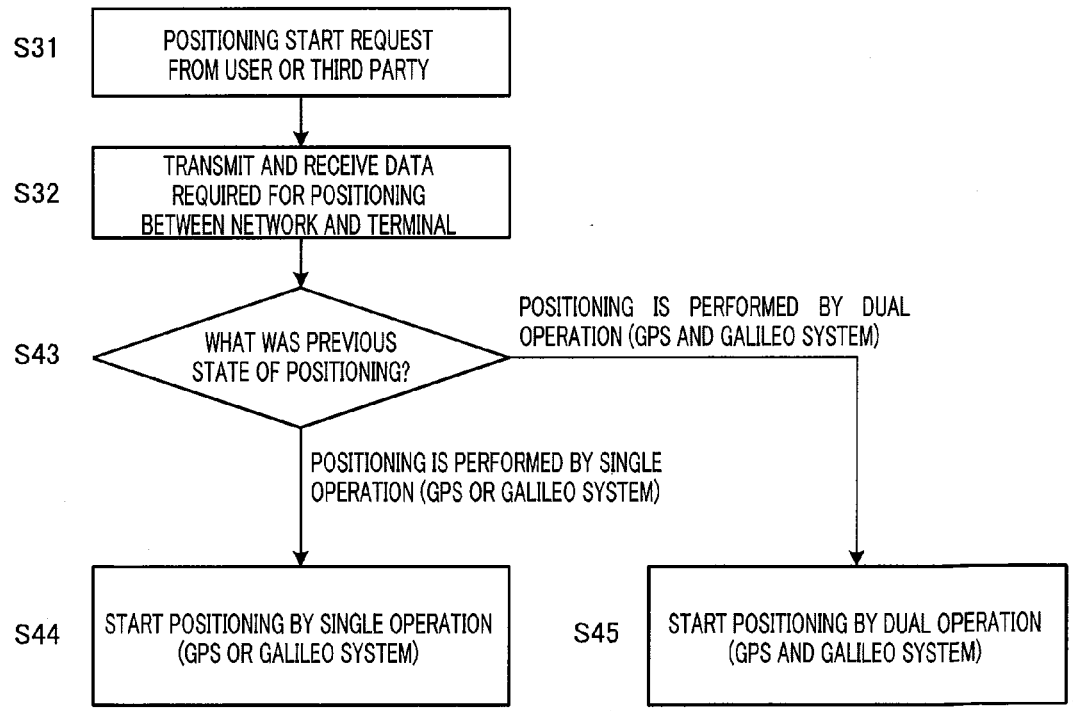
FIG. 10 is a flowchart showing a positioning start setting control in dual operation or single operation of the positioning receiving apparatus according to Embodiment 4 of the present invention.

FIG. 10 is a flowchart showing a positioning start setting control in dual operation or single operation. The steps to perform the same processings as in FIG. 9 will be assigned the same reference numerals.

First, when a positioning start request is received from the user or third party in step S31, data required for positioning is transmitted and received between the network and terminal in step S32.

The previous state of positioning is decided in step S43 and, if positioning is performed by single operation of GPS or the Galileo system, positioning is started next time in step S44 based on the previous state of positioning in single operation. Further, if positioning is performed by dual operation of GPS and the Galileo system in above step S43, positioning is started next time in step S45 based on the previous state of positioning by dual operation.

In this way, if positioning is possible by single operation based on the previous positioning result, positioning is started based on the previous state in single operation to perform positioning next time. Further, if positioning is possible by dual operation based on the previous positioning result, it is possible to perform positioning next time based on the previous state of positioning.

Positioning Start Setting Example 3

Figure 11:
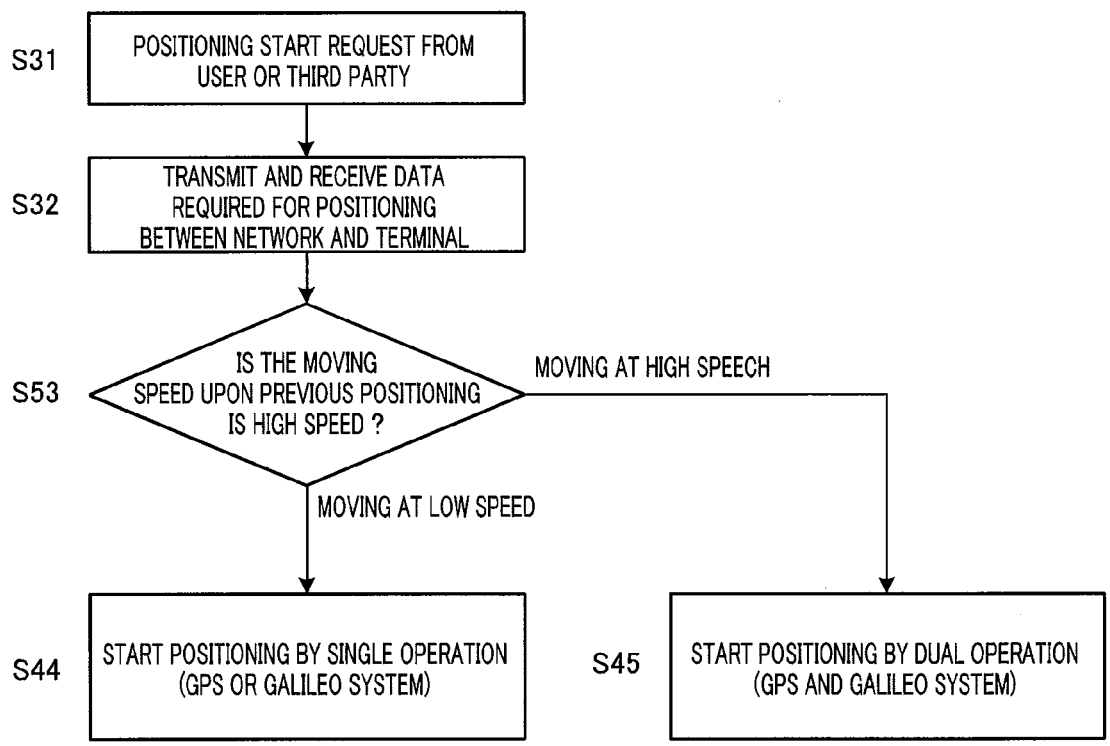
FIG. 11 is a flowchart showing a positioning start setting control in dual operation or single operation of the positioning receiving apparatus according to Embodiment 4 of the present invention.

FIG. 11 is a flowchart showing a positioning start setting control in dual operation and single operation. The steps to perform the same processings as in FIG. 10 will be assigned the same reference numerals.

First, when a positioning start request is received from the user or third party in step S31, data required for positioning is transmitted and received between the network and terminal in step S32.

The moving speed of the terminal upon previous positioning is decided in step S53, and, if the terminal has moved at low speed upon previous positioning, positioning is started next time in step S44 based on the previous state of positioning in single operation. Further, if it is decided in above step S53 that the terminal has moved at high speed upon previous positioning, positioning is started next time in step S45 based on the previous state of positioning by dual operation.

By this means, it is possible to control the positioning operation based on the moving speed upon previous positioning.

Embodiment 5

A method of controlling a plurality of positioning systems will be explained with Embodiment 5. The configuration example in Embodiment 5 is directed to realizing much lower current consumption.

Figure 12:
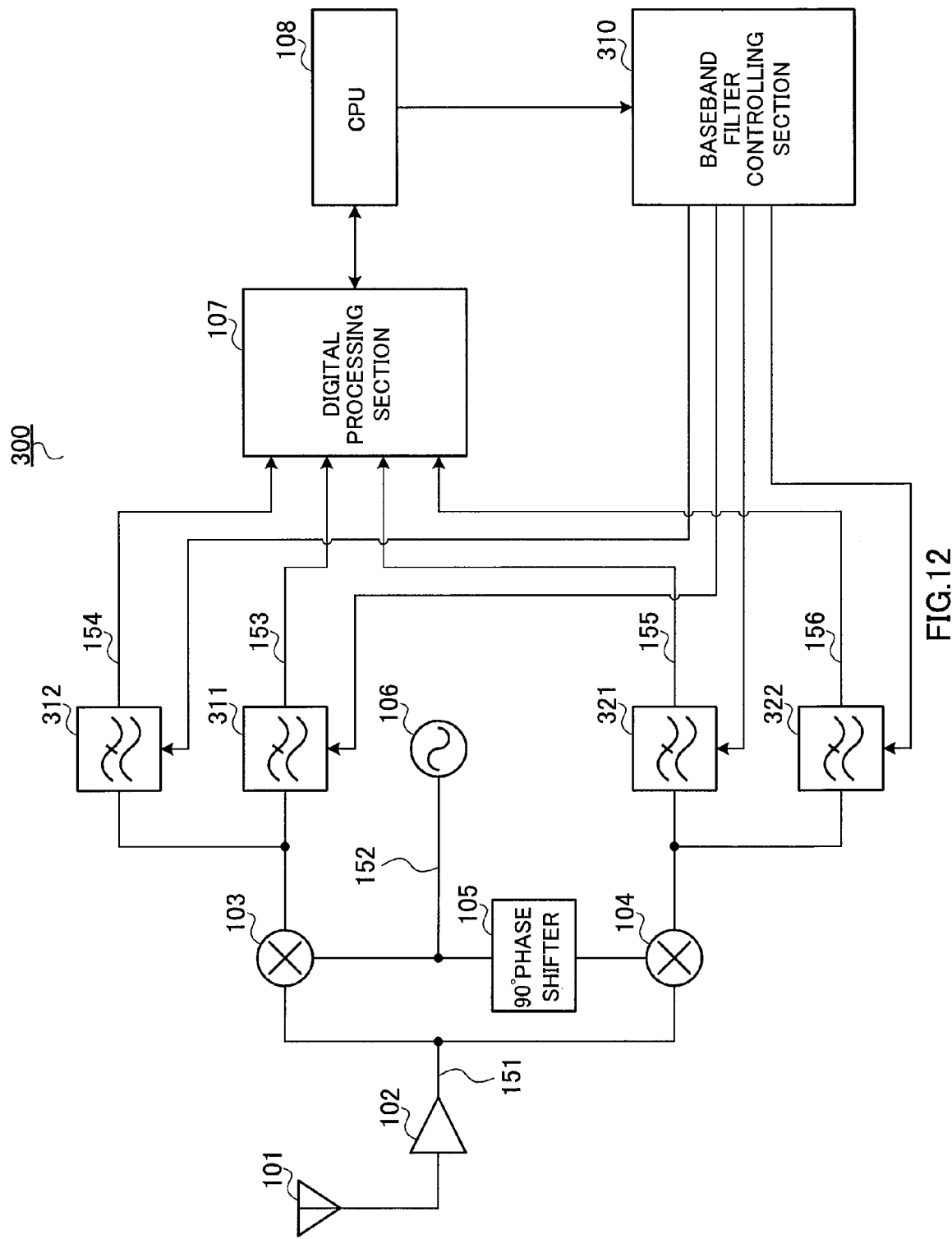
FIG. 12 is a functional block diagram showing the configuration of the positioning receiving apparatus according to Embodiment 5 of the present invention.

FIG. 12 is a functional block diagram showing the configuration of the positioning receiving apparatus according to Embodiment 5 of the present invention. The same components as in FIG. 6 will be assigned the same reference numerals to explain the present embodiment, and explanation of overlapping components will be omitted.

In FIG. 12, positioning receiving apparatus 300 is constituted by: receiving antenna 101; received signal amplifier 102; first signal mixer 103 for I-ch; second signal mixer 104 for Q-ch; 90 degree phase shifter 105; local oscillator 106; first I low pass filter 311, which is the first I baseband filter that can change a bandwidth according to control signals from baseband filter controlling section 310; second I low pass filter 312 that is connected in parallel to first I low pass filter 311 and that limits the bandwidth to the narrower bandwidth of the system (here, GPS); first Q low pass filter 321, which is the first Q baseband filter that can change the bandwidth according to control signals from baseband filter controlling section 310; second Q low pass filter 322 that is connected in parallel to first Q low pass filter 321 and that limits the bandwidth to the narrower bandwidth of the system (here, GPS); digital processing section 107; CPU 108; and baseband filter controlling section 310.

Baseband filter controlling section 310 controls I and Q baseband filters to adopt to the Galileo system and GPS to improve the positioning rate and realize lower current consumption. To be more specific, (1) when only the Galileo system of the wider bandwidth is used, baseband filter controlling section 310 changes bandwidths of first I low pass filter 311 and first Q low pass filter 321 to wider bandwidths and then operate the circuits of first I low pass filter 311 and first Q low pass filter 321, and stops the circuit operations of second I low pass filter 312 and second Q low pass filter 322. (2) When only GPS of the narrower bandwidth is used, baseband filter controlling section 310 operates the circuits of second I low pass filter 312 and second Q low pass filter 322 of narrower bandwidths, and stops the circuit operations of first I low pass filter 311 and first Q low pass filter 321 of wider bandwidths. (3) In dual operation using both the Galileo system and GPS, baseband filter controlling section 310 operates the circuits of first I low pass filter 311, second I low pass filter 312, first Q low pass filter 321 and second Q low pass filter 322.

First I low pass filter 311 and first Q low pass filter 321 can change the bandwidths by changing the filter orders or the constants of the filter circuits according to control signals from baseband filter controlling section 310. In this case, first I low pass filter 311 and first Q low pass filter 321 only need to be switched between the two directions of a wide bandwidth and narrow bandwidth.

The operation of positioning receiving apparatus 300 of the present embodiment is the same as the filter control flowchart of Embodiment 2 (FIG. 7) and the filter control flowchart of Embodiment 3 (FIG. 8). Further, the positioning start setting in dual operation or in single operation is the same as in Embodiment 4.

According to the present embodiment, baseband filter controlling section 310 changes bandwidths of first I low band pass filter 311 and first Q low pass filter 321 from wider bandwidths to narrower bandwidths, so that it is possible to stop the circuit operations of second I low pass filter 312 and second Q low pass filter 322 by single operation of GPS in FIG. 7 and FIG. 8 and, consequently, realize much lower current consumption.

The above explanation is illustration of preferable embodiments of the present invention, and the scope of the present invention is not limited to these.

For example, in the above embodiments, the criterion to decide that reception is stable is as follows. (1) Decision is made based on the number of positioning satellite signals (three or four signals) received in the Galileo system or GPS. When the number of positioning satellite signals is greater, it is decided that the positioning environment is better and stable reception is possible. (2) CPU 108 makes a decision based on data about the receiving electric field levels of the positioning satellites. When the receiving electric field levels of positioning satellites are higher, it is decided that the positioning environment is better and stable reception is possible.

Further, by controlling as the operating circuit blocks the digital processing section in the same way as the filters, it is possible to further save power in the above embodiments.

Figure 13:
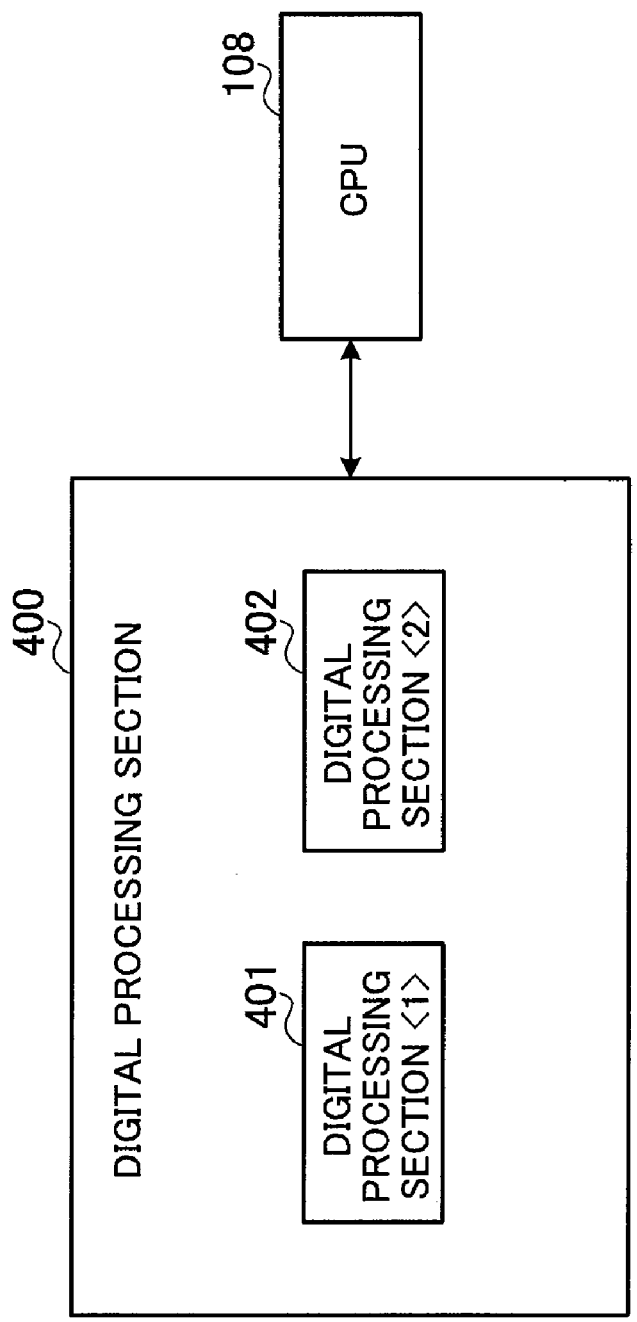
FIG. 13 is a block diagram showing the configuration of a digital processing section according to each embodiment of the present invention.

FIG. 13 is a block diagram showing the configuration of digital processing section 400 of the positioning receiving apparatus. As shown in FIG. 13, instead of digital processing section 107 in FIG. 3, FIG. 6 and FIG. 12, the positioning receiving apparatus has digital processing section 400 that has first digital processing section 401 (digital processing section "1") and second digital processing section 402 (digital processing section "2"), so that it is possible to support three or more positioning systems. The filter configuration employs not only the first I and Q baseband filters and the second I and Q baseband filters, but also employ the third I and Q baseband filters and the fourth I and Q baseband filters.

Further, although the name "positioning receiving apparatus" is used with the present embodiment for ease of explanation, the name such as "positioning system" or "receiving apparatus" may be possible.

Furthermore, the circuit sections constituting the above positioning receiving apparatus, the tap factors, the connecting method thereof and the type of the digital processing section are not limited to the above-described embodiments.

INDUSTRIAL APPLICABILITY

The positioning receiving apparatus according to the present invention is useful for mobile communication terminals having functions of capturing signals transmitted from GPS and Galileo system satellites. For example, in addition to GPS and the Galileo system, the present invention is widely applied to a plurality of positioning systems such as GLONAS of Russia, WASS of the Untied States of America, MASA of Japan and EGNOS of Europe that transmit a plurality of satellite signals subjected to spectrum spreading according to a plurality of synchronized modulation codes.

The invention claimed is:

1. An apparatus, comprising:
   a mixer configured to convert received satellite signals into frequency domain baseband signals;
   a baseband filter coupled to an output of the mixer and configured to limit an output signal of the mixer to a first bandwidth;
   a low pass filter coupled to an output of the baseband filter and configured to limit an output signal of the baseband filter to a second bandwidth; and
   a signal processor configured to extract position data from at least one of a first baseband signal from the baseband filter and a second baseband signal from the low pass filter; and
   a filter controller configured to selectively set the first bandwidth equal to the second bandwidth and to disable the low pass filter when the first bandwidth is set equal to the second bandwidth.

2. The apparatus according to claim 1, further comprising an amplifier configured to amplify received satellite signals and coupled to an output of the mixer.

3. The apparatus according to claim 1 wherein:
   the first bandwidth is a bandwidth of a first type of positioning signals, the second bandwidth is a bandwidth of a second type of positioning signals and the first type of positioning signals have a wider bandwidth than the second type of positioning signals.

4. The apparatus according to claim 1, wherein an order of the low pass filter is lower than an order of the baseband filter.

5. The apparatus according to claim 1, wherein:
   the filter controller is further configured to:
   enable the baseband filter and the low pass filter to start a positioning operation; and
   disable the baseband filter or the low pass filter when the positioning operation stabilizes.

6. The apparatus according to claim 5, wherein:
   the filter controller is further configured to:
   maintain operation of the baseband filter and the low pass filter for a determined period of time when the positioning operation does not stabilize.

7. The apparatus according to claim 5, further comprising a speed detector configured to detect a moving speed,
   wherein the filter controller is further configured to enable the baseband filter and the low pass filter when the moving speed is equal to or higher than a threshold speed.

8. The apparatus according to claim 5, wherein the filter controller is further configured to set a time to enable at least one of the baseband filter and the low pass filter based on a previous positioning result.

9. The apparatus according to claim 5, wherein the filter controller is further configured to set a time to enable at least one of the baseband filter and the low pass filter based on an electric field level of a received satellite signal.

10. The apparatus according to claim 5, wherein the filter controller is further configured to set a time to enable at least one of the baseband filter and the low pass filter based on a number of received satellite signals used to generate a previous positioning result.

11. The apparatus according to claim 3, wherein the first type of positioning signals are global positioning system signals and the second type of signals are Galileo system signals.

12. The apparatus according to claim 1, further comprising a satellite controller configured to:
    select satellites to scan
    track received satellite signals; and
    acquire navigation messages transmitted from satellites.

13. The apparatus according to claim 1, further comprising a signal line parallel to the low pass filter and configured to selectively bypass the low pass filter.

14. A method, comprising:
    converting, using a mixer, received satellite signals into frequency domain baseband signals;
    limiting, using a baseband filter coupled to an output of the mixer, an output signal of the mixer to a first bandwidth;
    limiting, using a low pass filter coupled to an output of the baseband filter, an output signal of the baseband filter to a second bandwidth;
    extracting position data from at least one of a first baseband signal from the baseband filter and a second baseband signal from the low pass filter; and
    selectively setting the first bandwidth equal to the second bandwidth and disabling the low pass filter when the first bandwidth is set equal to the second bandwidth.

15. The method according to claim 14, further comprising:
    enabling the baseband filter and the low pass filter to start a positioning operation; and
    disabling the baseband filter or the low pass filter when the positioning operation stabilizes.

16. The method according to claim 15, further comprising:
    detecting a moving speed; and
    enabling the baseband filter and the low pass filter when the moving speed is equal to or higher than a threshold speed.

17. The method according to claim 15, further comprising:
    setting a time to enable at least one of the baseband filter and the low pass filter based on a previous positioning result.

18. An integrated circuit comprising:
    a mixer configured to convert signals received from satellites into frequency domain baseband signals;
    a first filter coupled to an output of the mixer and configured to limit an output signal of the mixer to a first bandwidth;

a second filter coupled to an output of the first filter and configured to limit an output signal of the first filter to a second bandwidth;

a signal processor configured to extract position data from at least one of a first baseband signal from the first filter and a second baseband signal from the second filter; and a filter controller configured to selectively set the first bandwidth equal to the second bandwidth and to disable the second filter when the first bandwidth is set equal to the second bandwidth.

* * * * *